S. HARPSTER.
Corn-Planter.
No. 68,070. Patented Aug. 27. 1867.
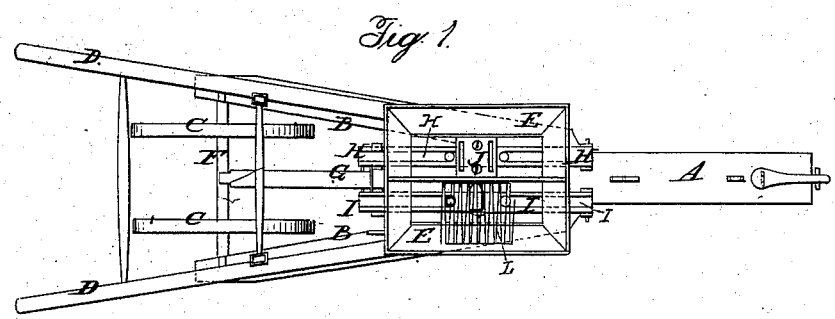
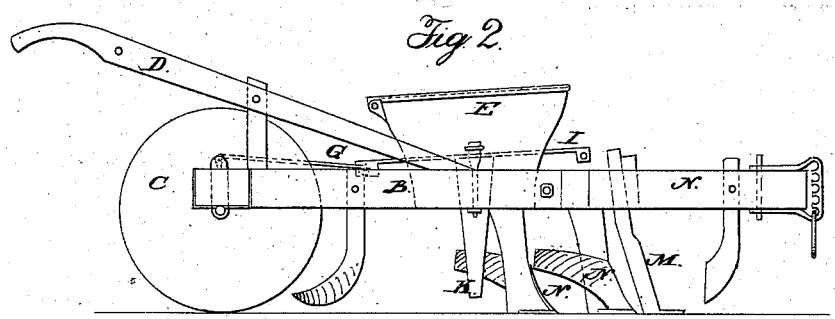
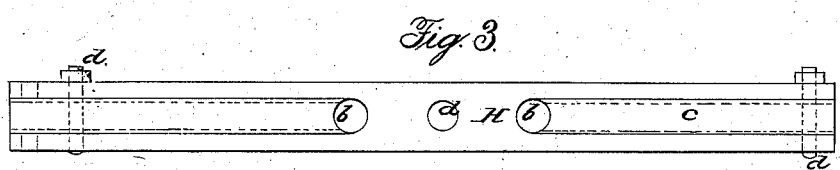
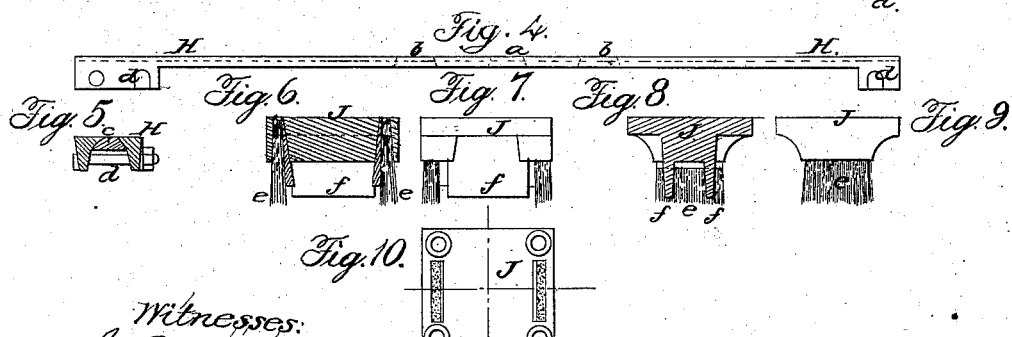
Witnesses:
Jno. D. Patten
J. Morris Pool
Inventor:
Samuel Harpster
By Atty. A.B. Stoughton

United States Patent Office.

SAMUEL HARPSTER, OF CENTRE HALL, PENNSYLVANIA.

Letters Patent No. 68,070, dated August 27, 1867.

IMPROVEMENT IN CORN-PLANTER.

*The Schedule referred to in these Letters Patent and making part of the same.*

TO ALL WHOM IT MAY CONCERN:

Be it known that I, SAMUEL HARPSTER, of Centre Hall, in the county of Centre, and State of Pennsylvania, have invented certain new and useful Improvements in Corn-Planting Machines; and I do hereby declare the following to be a full, clear, and exact description of the same, reference being had to the accompanying drawings, making a part of this specification, in which—

Figure 1 represents a top plan of the planting machine.

Figure 2 represents a side elevation of the machine.

Figures 3, 4, 5, 6, 7, 8, 9, and 10 represent different views of portions detached from the interior of the seed-hopper.

Similar letters of reference, where they occur in the separate figures, denote like parts of the machine in all of the drawings.

One of the leading objects of my invention is to prevent the brush from so moving the grain as to prevent it from dropping through the holes in the slide with regularity, and another part of my invention relates to the dropping of the grain in conjunction with a furrow-opening device which prepares the soil to receive the grains.

To enable others skilled in the art to make and use my invention, I will proceed to describe the same with reference to the drawings.

A represents a beam, to which the team that draws the machine is hitched. To this beam are connected the side pieces B, which are supported and carried by the wheels C, and to which side pieces are connected the handles D, the whole forming a support for the seed-hopper E. The axle F is of a crank form, and turns with the wheels C, and by means of the pitman G gives motion to the seed-slide H, and also to the slide I, by which a fertilizer of any kind may be sown with the corn, the hopper being divided into two compartments for this purpose, when the machine is built for such double purpose, but corn alone may be planted, if so preferred. The seed-slide H I have shown on a larger scale in figs. 3, 4, and 5. It has three openings through it, viz, a central one, $a$, and side holes, $b\ b$, which latter may be enlarged or adjusted by means of dove-tailed slides, $c\ c$, in the main slide, and a set-screw or screws, $d\ d$, to hold them when set. The brush-head or frame J, into which the bristles $e$ are set, is cast (for convenience) in one piece, with sockets, into which the bristles are fastened, but its essential characteristic consists in the sides or flanges $f$, which, in connection with the bristles $e$ which form ends, make an enclosed chamber, as it were, under the brush-head, out of which the grains of corn cannot be forced, as the bristles move the excess of grain from the seed-holes or cells $a\ b\ b$, which move under and past the bristles to receive their charge, and then to deliver the grain into the seed-duct K, that carries it into the opened furrow.

The brushes heretofore used, having no side flanges $f$, moved or swept the grains out of the line of the holes, and the consequence was that at times too little, and again too much grain, was dropped, and sometimes none at all, making the planting very uneven and irregular. The brush is stationary in the hopper, and the slides move past the brushes. There is a stirrer, L, in the fertilizer apartment to keep it from clinging to the sides and compelling it to fall on the distributor I. A coulter, M, is used in advance of the furrow-openers N N, of which latter there are two, one moving the soil to the right, and the other to the left. The seed-duct K guides the charges of corn into the furrow thus opened, and the coverers O O move the soil over the dropped charges. That the corn may not wedge in the holes or cells $a\ b\ b$, they are countersunk on the under side, so that as soon as the grains pass below the top surface of the slide they are free to drop through the thus enlarged space.

Having thus fully described my invention, what I claim therein as new, and desire to secure by Letters Patent, is—

1. In combination with the brushes and flanged brush-head, the slide H, having a central and side holes countersunk to prevent the grains from wedging therein, substantially as described.

2. I also claim, in combination with the brush-head and seed-slide, as described, the furrow-openers M N N, and seed-duct K and coverers O O, arranged and operating as and for the purpose described and represented.

SAMUEL HARPSTER.

Witnesses:
A. B. STOUGHTON,
U. D. OSSMAN.